United States Patent
Schulze (10) Patent No.: US 11,717,002 B2
(45) Date of Patent: Aug. 8, 2023

(54) DEVICE AND METHOD FOR SEPARATING AT LEAST ONE TENDON THAT CONNECTS A BREAST FILLET OF A GUTTED POULTRY BODY, OR A PART THEREOF, TO A CARCASS OF THE POULTRY BODY, OR A PART THEREOF, AND A TOOL UNIT THEREFOR

(71) Applicant: Nordischer Maschinenbau Rud. Baader GmbH + Co. KG, Lübeck (DE)

(72) Inventor: Adrian Schulze, Lübeck (DE)

(73) Assignee: NORDISCHER MASCHINENBAU RUD. BAADER GMBH + CO. KG, Lubeck (DE)

(*) Notice: Subject to any disclaimer, the term of this patent is extended or adjusted under 35 U.S.C. 154(b) by 175 days.

(21) Appl. No.: 17/426,018

(22) PCT Filed: Jan. 16, 2020

(86) PCT No.: PCT/EP2020/051056
§ 371 (c)(1),
(2) Date: Jul. 27, 2021

(87) PCT Pub. No.: WO2020/156825
PCT Pub. Date: Aug. 6, 2020

(65) Prior Publication Data
US 2022/0338492 A1 Oct. 27, 2022

(30) Foreign Application Priority Data
Jan. 29, 2019 (EP) .................. 19154184

(51) Int. Cl.
*A22C 21/00* (2006.01)
*A22C 21/06* (2006.01)

(52) U.S. Cl.
CPC .......... *A22C 21/06* (2013.01); *A22C 21/0053* (2013.01)

(58) Field of Classification Search
CPC ................ A22C 21/06; A22C 21/0053
(Continued)

(56) References Cited

U.S. PATENT DOCUMENTS

| 4,723,341 A * | 2/1988 | Reuveni ............... A22C 21/066 452/172 |
| 4,951,354 A | 8/1990 | Callsen et al. |

(Continued)

FOREIGN PATENT DOCUMENTS

| CN | 104125775 A | 10/2014 |
| CN | 104719420 A | 6/2015 |

(Continued)

OTHER PUBLICATIONS

International Search Report dated Apr. 8, 2020; International Application No. PCT/EP2020/051056.

*Primary Examiner* — Richard T Price, Jr.
(74) *Attorney, Agent, or Firm* — Dinsmore & Shohl LLP (57) ABSTRACT

An apparatus to separate a tendon connecting a breast fillet of a gutted poultry body, from which wings have been removed, to a carcass of the poultry body, has a transport apparatus having a transport unit which is driven in a revolving manner, and a holding apparatus fastened thereto to hold the poultry body or part thereof during processing, and a means for separating the tendon. The means for separating is movable from a standby position into a separating position and back. The transport unit, with the holding apparatus, with the formation of a transport path, transports the poultry body or the part thereof in a direction of transport, with the anus side leading, in the direction towards the means for separating. The means for separating the tendon includes at least one combination tool which has a (Continued)

portion that displaces the breast fillet and a portion that separates the tendon.

17 Claims, 4 Drawing Sheets

(58) Field of Classification Search
USPC .......................................................... 452/172
See application file for complete search history.

(56) References Cited

U.S. PATENT DOCUMENTS

| | | | |
|---|---|---|---|
| 5,314,374 A * | 5/1994 | Koch .................. | A22C 21/003 |
| | | | 452/136 |
| 8,801,508 B2 | 8/2014 | Landt | |
| 9,155,316 B2 | 10/2015 | Souli et al. | |
| 9,220,283 B2 | 12/2015 | Landt et al. | |
| 9,433,223 B2 | 9/2016 | Landt | |
| 2013/0157554 A1 | 6/2013 | De Vos et al. | |

FOREIGN PATENT DOCUMENTS

| | | |
|---|---|---|
| CN | 204868997 U | 12/2015 |
| DE | 102011107067 B3 | 12/2012 |
| EP | 0336162 A1 | 10/1989 |
| EP | 2606736 A1 | 6/2013 |
| EP | 2622962 A1 | 8/2013 |
| WO | 2018065430 A1 | 4/2018 |

\* cited by examiner

DEVICE AND METHOD FOR SEPARATING AT LEAST ONE TENDON THAT CONNECTS A BREAST FILLET OF A GUTTED POULTRY BODY, OR A PART THEREOF, TO A CARCASS OF THE POULTRY BODY, OR A PART THEREOF, AND A TOOL UNIT THEREFOR

CROSS-REFERENCE TO RELATED APPLICATIONS

This application is the U.S. National Stage of PCT/EP2020/051056 filed Jan. 16, 2020, which claims priority to European Application No. 19154184.6, filed Jan. 29, 2019, the entire content of both are incorporated herein by reference in their entirety.

FIELD OF THE INVENTION

The invention relates to an apparatus, configured and adapted to separate at least one tendon connecting a breast fillet of a gutted poultry body from which wings have been removed, or a part thereof, to a carcass of the poultry body or part thereof, comprising a transport apparatus having a transport unit which is driven in a revolving manner and at least one holding apparatus fastened thereto which is configured and adapted to hold the poultry body or the part thereof during processing, and a means for separating the tendon, wherein the means for separating the tendon is configured and adapted so as to be movable from a standby position into a separating position and back, and the transport unit, with the or each holding apparatus, with the formation of a transport path, is configured and adapted to transport the poultry body or the part thereof in a direction of transport T, with the anus side leading, in the direction towards the means for separating.

The invention relates further to a method, configured and adapted to separate at least one tendon connecting a breast fillet of a gutted poultry body from which wings have been removed, or a part thereof, to a carcass of the poultry body or part thereof, comprising the steps: saddling the poultry body or the part thereof onto a holding apparatus fastened to a transport unit, transporting the poultry body or the part thereof by means of the transport unit along a transport path in a direction of transport T, with the anus side leading, in the direction towards a means for separating, separating the tendon with the means for separating by moving the means for separating from a standby position into a separating position when the poultry body or the part thereof is transported past the means for separating, wherein the means for separating is moved back into the standby position after the tendon has been separated.

The invention relates also to a tool unit, configured and adapted to separate a tendon connecting a breast fillet of a gutted poultry body from which wings have been removed, or a part thereof, to a carcass of the poultry body or part thereof.

BACKGROUND OF THE INVENTION

In the poultry-processing industry, gutted poultry bodies or parts thereof are processed automatically or semi-automatically in corresponding apparatuses, which are frequently referred to as chicken-filleting machines. For processing, the poultry bodies or parts thereof must be positioned relative to the respective processing tools. Conventionally, a plurality of holding apparatuses are fastened to a transport unit which is driven in a revolving manner and by means of which the poultry bodies or parts thereof are conveyed in a direction of transport T along a transport path to one or more processing stations, or are brought into the operating region thereof. At the start of processing, the poultry bodies or parts thereof are pushed onto and fixed to the holding apparatus automatically or manually. This procedure as a whole is also referred to as saddling.

As an example of the processing of poultry bodies or parts thereof there is mentioned at this juncture the removal of breast fillets from breast caps, in which the wings have already been removed. However, processing also concerns in a similar manner so-called "front halves" or other parts of the poultry body that still carry the breast fillets. In fully automatic or semi-automatic chicken-filleting machines, the saddled breast caps, from which the wings have already been removed on both sides by means of a so-called wing cut in the region of their wing joints, for example by a so-called "cut-up apparatus", are conveyed to a processing station by means of which the breast fillet, preferably and conventionally both breast fillets of a breast cap, is detached from the carcass in the region of the wing joints by means of a tool, for example a scraper or a knife. This processing step, which is referred to as loosening, is followed in the further processing process by the complete detachment and separation of the breast fillets from the carcass.

However, the loosening of the breast fillets is made more difficult by inadequate and/or incomplete wing cuts, since poor wing cuts result in tendons being left on the wing joint which still firmly connect the breast fillet, that is to say the outer fillet, to the carcass. A further problem is that preliminary detachment causes losses in yield, since at least part of the breast fillet is left behind on the wing joint.

In known solutions in which loosening is carried out with a blade, the breast cap is transported along the transport path defined by the transport unit and the or each holding apparatus with the anus side leading, that is to say with the wing joints trailing in the direction of transport T. The direction of transport T can be provided permanently with the anus side leading. Of course, it is also possible for the breast cap to be brought into the desired position/orientation only when it is immediately upstream of the means for separating. When the holding apparatus with the breast cap fixed thereto is transported past the means for separating the tendon, the means is moved from the standby position into the separating position. In this context, standby position means that the means for separating is situated so far outside the transport path that the holding apparatus, or the breast cap fixed thereto, is able to pass the means for separating without engaging into the breast cap. In this context, separating position means that the means for separating projects into the transport path, such that the breast cap fixed to the holding apparatus necessarily comes into contact with the means for separating. In other words, the separating position describes the position in which the means for separating is in its intended and functional position. In the separating position, the means for separating is so adjusted that it comes into contact, for separation, with the region of the wing joint in which the tendon extends. After separation of the tendon, the means for separating is moved back into the standby position again.

In the known solutions, the means for separating is a type of burin, or a blade, which punctures the outer fillet from the outside in the direction towards the wing joints. It is not only the breast fillet, or outer fillet, that is thereby incised. There is also the risk that the inner fillet lying beneath the outer fillet will be damaged.

SUMMARY OF THE INVENTION

Accordingly, the object underlying the invention is to provide a simple and compact apparatus which ensures a filleting result that is improved in terms of quality and quantity regardless of the quality of the wing cut. It is a further object to propose a corresponding method and a tool unit for carrying out this method.

This object is achieved by an apparatus of the type mentioned hereinbefore in that the means for separating the tendon comprises at least one combination tool which is configured and adapted such that it has a portion that displaces the breast fillet and a portion that separates the tendon. With the combination tool according to the invention and the corresponding configuration as a combined displacing and separating means, reliable loosening of the breast fillets in the region of the wing joint in a manner that protects the outer and inner fillet is ensured, whereby the outer fillets can be stripped away more easily. As a result, the loosening of the outer fillets can reliably be achieved regardless of the quality of the wing cut, that is to say even in the case of wing cuts that are not performed anatomically correctly, so that the outer fillets can be obtained/harvested undamaged and completely, that is to say without residual flesh on the carcass.

The means for separating expediently comprises two combination tools which are arranged on mutually opposite sides of the transport path, wherein the two combination tools are arranged offset relative to one another diametrically or in the direction of transport T. As a result, synchronous or temporally offset processing of both breast fillets of a breast cap can be performed rapidly and reliably in a compact manner.

A preferred further development is characterised in that each combination tool is configured so as to be pivotable about a vertically directed axis which is oriented perpendicularly to the direction of transport T. This form, in the case of a holding apparatus guided in a horizontal plane in the region of the means for separating, leads to reliable and rapid movement of the combination tools from the standby position into the separating position and back. However, the orientation of the pivot axis can vary depending on the orientation/position of the transport unit, or of the holding apparatuses fastened to the transport unit.

Each combination tool particularly preferably comprises a blade holder and a blade, wherein the blade holder is configured and adapted on the side facing the transport path so as to be blunt for displacing the breast fillet, while the blade is configured and adapted on the side remote from the transport path so as to be sharp-edged for separating the tendon. In other words, the combination tool, both in the standby position and in the separating position, is blunt on the side facing the breast fillet to be processed, while on the side remote from the breast fillet it is configured so as to be sharp-edged. The sharp-edged side, that is to say the blade, is accordingly shielded relative to the breast fillet by the blunt blade holder at least on the longitudinal side, so that contact between the blade and the breast fillet is prevented. By the combination of the blade holder and the blade, both the displacement step for displacing the breast fillet and creating access to the tendon and the separating step for cutting the tendon can be carried out in a compact manner with one tool.

The blade holder advantageously has a blunt threading edge which in the standby position of the combination tool, when seen in the direction of transport T, is oriented so as to taper in that direction and in the separating position of the combination tool is oriented approximately parallel to the direction of transport T. With this form, the combination tool can be moved gently against the breast fillet, so that it is able to lightly penetrate the breast fillet without damaging it, wherein the inclined position of the opposing threading edges of the two blade holders in the standby position forms a type of inlet funnel, or inlet aid, for the breast cap to be processed, while the threading edges oriented linearly and parallel to the direction of transport T in the separating position facilitate the guiding of the combination tool into the region of the wing joint, in which the tendon is located, and in particular also facilitate the threading/collection of the tendon.

An advantageous further development is characterised in that the blunt threading edge has at its free end, which faces in the opposite direction to the direction of transport T, a rounded guiding lug which covers the blade in the direction of transport T. This guiding lug, as part of the blade holder, ensures that neither the breast fillets nor any other part of the breast cap comes directly, that is to say frontally, into contact with the blade during transport in the direction of transport T. On the contrary, the guiding lug ensures that the tendon to be separated in the region of the wing joint is threaded/collected and guided in the direction towards the blade on pivoting into the separating position.

The blade holder and the blade are expediently formed integrally with one another and produced from stainless steel. In other words, the blade is an integral part of the blade holder. As a result of the integral nature, that is to say the one-part configuration, of the blade holder including the guiding lug and the blade, a longitudinal side of the blade holder and the end face opposing the direction of transport T is configured so as to be blunt, that is to say forms the threading edge, while the other longitudinal side is configured so as to be sharp-edged. A simple and compact tool, which is also still easy to clean, is thus created. The blade holder and the blade can, however, also be separate elements which are fixedly but releasably connected to one another.

Each combination tool, that is to say in particular the blade holder and/or the blade, is/are releasably arranged on an adjusting arm, wherein the adjusting arm is configured and adapted so as to be adjustable in respect of its position transversely to the direction of transport T in order to change the distance of the combination tool from the holding apparatus and thus to change the depth of penetration of each combination tool into the poultry body to be processed or the part thereof. On the one hand, it is thereby ensured that the inner fillet, which lies beneath the breast fillet, or outer fillet, is reliably protected from contact with the combination tool. On the other hand, the combination tool can be individually adapted to different products and in particular to variable sizes of the poultry bodies to be processed or parts thereof.

The blade holder and/or the blade is/are advantageously configured and adapted so as to be adjustable in terms of its/their position, or orientation, relative to the holding apparatus in order to change the angle of the cutting edge and/or of the threading edge relative to the direction of transport T. Individual adaptation of the combination tool to, for example, different anatomies of the poultry bodies to be processed is thus ensured.

Each combination tool is particularly preferably configured and adapted so as to be adjustable in the vertical direction relative to the direction of transport T. The extent to which the combination tool penetrates the poultry body or the part thereof can thereby be determined.

In a preferred embodiment, each combination tool is connected to a control and/or regulating device, such that the time at which the combination tool penetrates the poultry body to be processed or the part thereof, that is to say in particular the movement from the standby position into the separating position and back, can be controlled and/or regulated individually. With this embodiment, a filleting result that is optimised in terms of quality and quantity regardless of the quality of the wing cut can be achieved particularly simply and precisely.

The object is also achieved by a method having the steps mentioned hereinbefore in that, as the means for separating moves from the standby position into the separating position, it penetrates the breast fillet with a portion of the means for separating that displaces the breast fillet and thereby initially only picks up the tendon and, as the poultry body or the part thereof is transported further, the tendon is then guided onto a portion of the means for separating that separates the tendon, whereby the tendon is separated completely. Accordingly, the means for separating first penetrates the outer breast fillet without cutting, that is to say without cutting in a manner that damages the breast fillet, until the tendon is picked up, and only then is the tendon separated by the means for separating.

The means for separating preferably comprises at least one combination tool which comprises a blade holder and a blade, wherein the blade holder, on pivoting from the standby position into the separating position, lightly penetrates the poultry body or the part thereof with a blunt threading edge, without cutting the poultry body or the part thereof, and thereby threads the tendon, and the tendon, as a result of the poultry body or the part thereof being transported further, is guided onto a sharp-edged cutting edge of the blade and is cut.

The method is particularly preferably carried out with an apparatus as described herein.

The object is further achieved by a tool unit which is distinguished by the following features: an adjusting arm and a combination tool which is formed of a blade holder and a blade and is fastened to the adjusting arm to form an L-shaped unit, wherein the adjusting arm forms the long leg of the L and the combination tool forms the short leg of the L, and wherein the blade holder covers the blade on a longitudinal side of the blade and on an end face of the blade to form a blunt displacing portion, while the blade has a sharp-edged separating portion on the longitudinal side opposite the blunt longitudinal side, wherein the inner side of the short leg facing the adjusting arm forms the sharp-edged separating portion and the outer side of the short leg facing away from the adjusting arm forms the displacing portion.

The tool unit is in particular configured and adapted to carry out the method described hereinbefore.

The advantages arising from the mentioned method steps and features have already been described in connection with the apparatus, so that, in order to avoid repetition, reference is made to the corresponding passages.

BRIEF DESCRIPTION OF THE DRAWINGS

Further expedient and/or advantageous features and further developments of the apparatus and of the method and also of the tool unit will become apparent from the description. Particularly preferred embodiments of the invention will be explained in greater detail with reference to the accompanying drawing, in which.

DETAILED DESCRIPTION OF THE INVENTION

The apparatus shown in the drawing serves for the synchronous separation of at least two tendons of a breast cap having two breast fillets. The apparatus can also be configured and adapted to separate a single tendon. The apparatus is further configured and adapted to correspondingly process other parts of a poultry body carrying at least one breast fillet.

Figure 2:
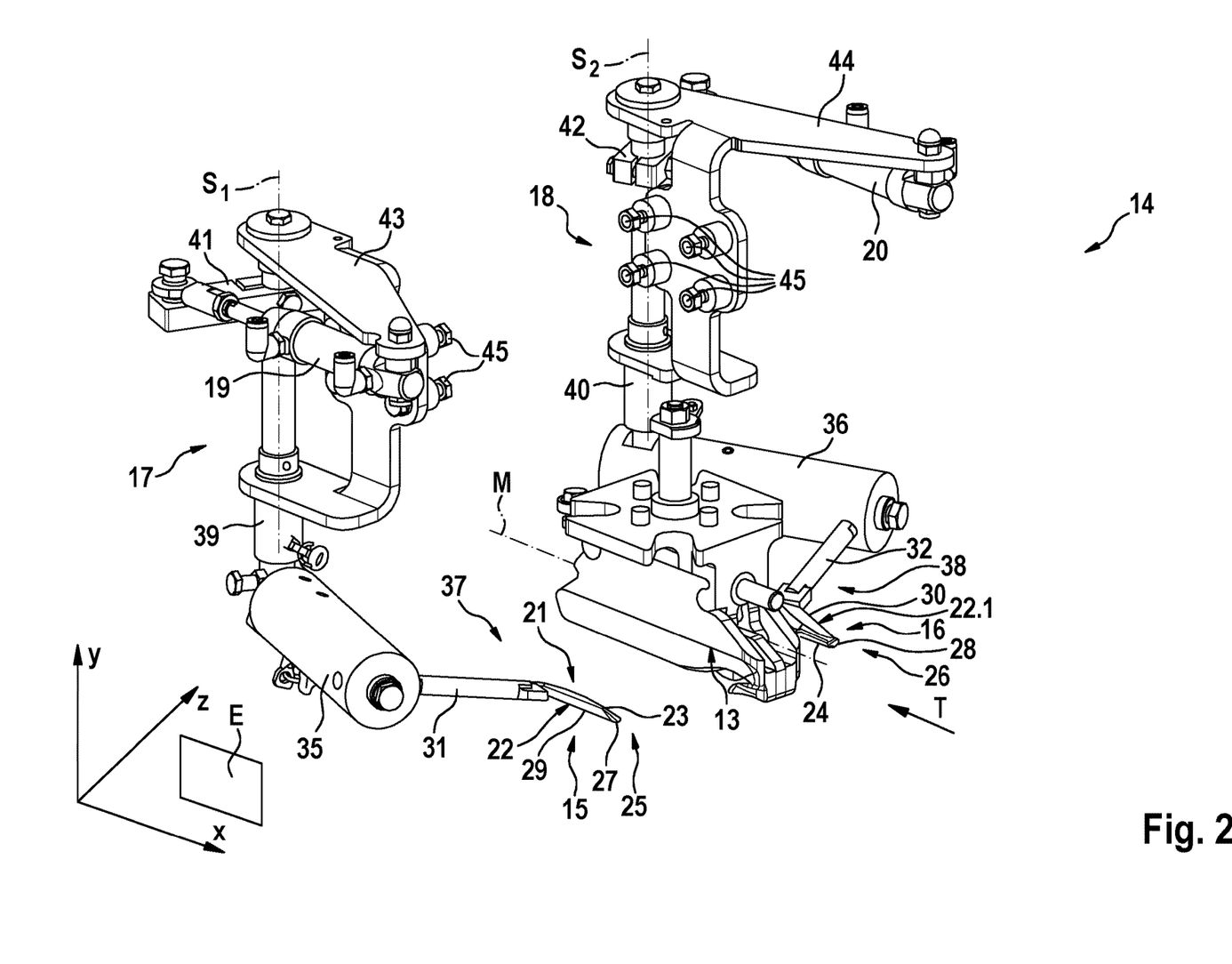
FIG. 2 is a perspective view of the means for separating the tendon having two combination tools, or tool units, arranged on both sides of a transport path, in the standby position, wherein the transport apparatus has for the most part been omitted for the sake of clarity.
Figure 3:
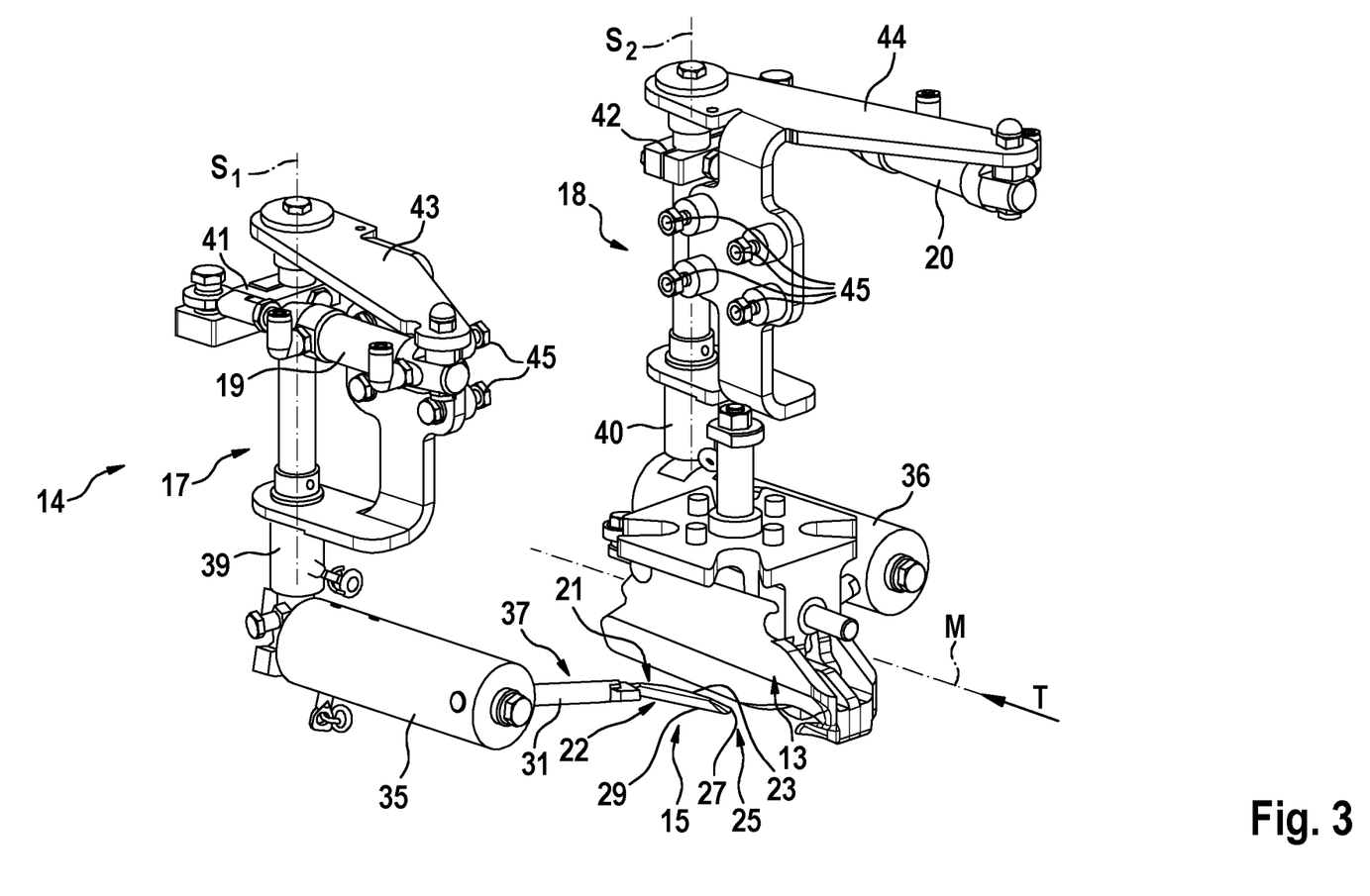
FIG. 3 is a perspective view of the means for separating the tendon having two combination tools, or tool units, arranged on both sides of a transport path, in the separating position, wherein the transport apparatus has for the most part been omitted for the sake of clarity.
Figure 4:
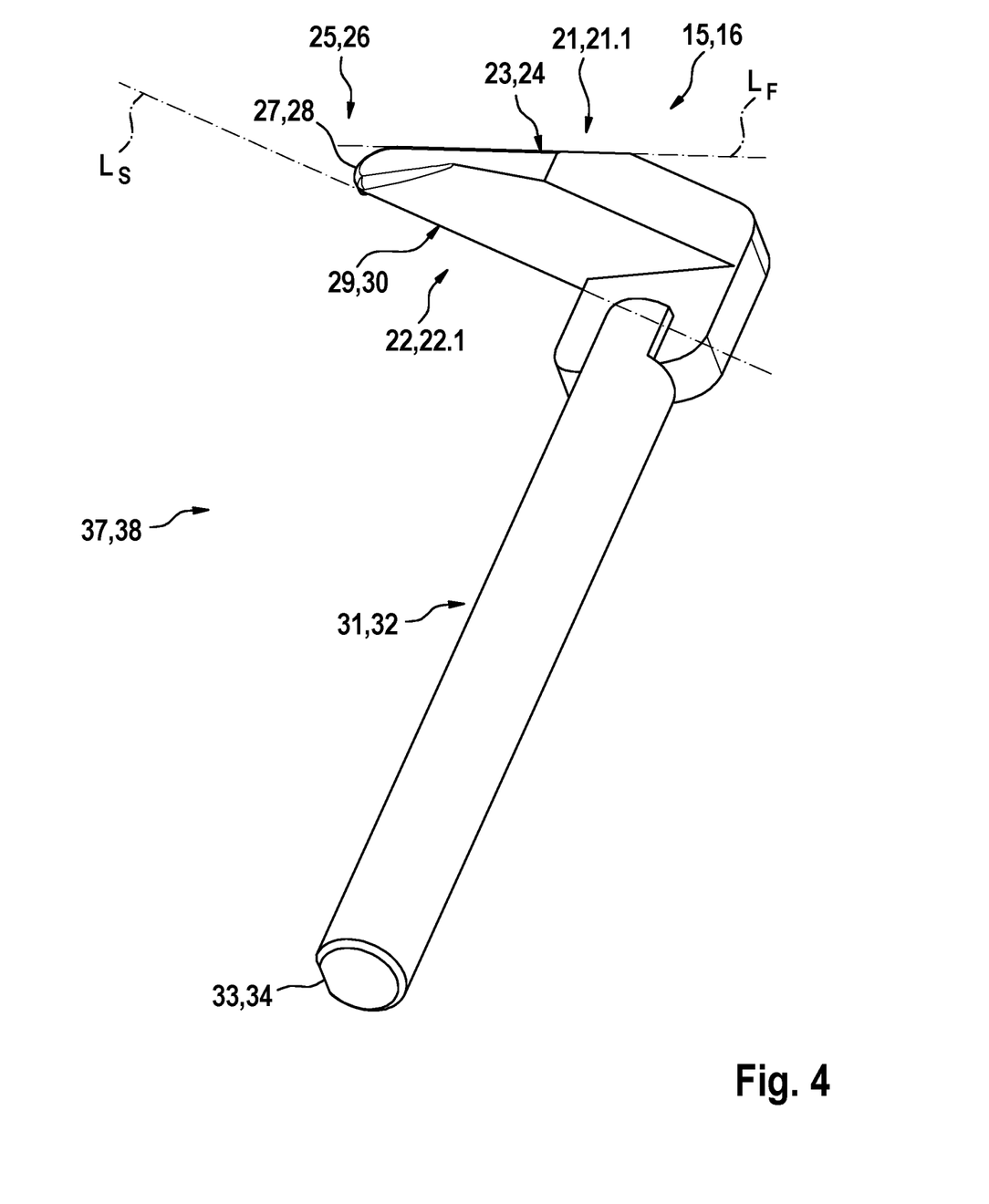
FIG. 4 is an enlarged representation of a tool unit in a perspective view.

The apparatus 10 shown in the drawing is configured and adapted to separate at least one tendon connecting a breast fillet of a gutted poultry body from which wings have been removed, or a part thereof, to a carcass of the poultry body or part thereof, and comprises a transport apparatus 11 having a transport unit 12 which is driven in a revolving manner, and at least one holding apparatus 13 fastened thereto which is configured and adapted to hold the poultry body or the part thereof during processing. The apparatus 10 further comprises a means 14 for separating the tendon, wherein the means 14 for separating is configured and adapted so as to be movable from a standby position (see in particular FIG. 2) into a separating position (see e.g. FIG. 3) and back, and the transport unit 12, with the or each holding apparatus 13, with the formation of a transport path, is configured and adapted to transport the poultry body or the part thereof in a direction of transport T, with the anus side leading, in the direction towards the means 14 for separating.

According to the invention, this apparatus is distinguished in that the means 14 for separating the tendon comprises at least one combination tool 15, 16 which is configured and adapted such that it has a portion that displaces the breast fillet and a portion that separates the tendon.

The features and further developments described hereinbelow represent preferred embodiments when considered on their own or in combination with one another. It is expressly pointed out that features which are combined in the description and/or the drawing or described in a common embodiment may also functionally independently develop further the apparatus 10 described hereinbefore.

In the embodiment shown, the transport unit 12 is, for example, a chain which is driven in a revolving manner by a drive, not shown, and which is guided around drive and deflection elements, likewise not shown. The axes of rotation of the drive and deflection elements are oriented horizontally, for example, so that the transport unit 12 has an upper run and a lower run. The axes of rotation of the drive and deflection elements for the transport unit 12 can, however, also be oriented in an inclined manner or vertically. A single holding apparatus 13 can be provided. Preferably, however, a plurality of such holding apparatuses 13 are provided (see FIG. 1). The or each holding apparatus 13 is preferably configured and adapted for a push-on direction of the poultry body or the part thereof that extends parallel to the plane of symmetry E of the holding apparatus 13. The plane of symmetry E, which is spanned by the X- and Y-axis, runs vertically and parallel to the direction of transport T. The centre axis M of the holding apparatus 13 is likewise oriented parallel to the direction of transport T. The holding apparatus 13 can, however, also be oriented with its plane of symmetry E horizontally or extend in an oblique position. Each holding apparatus 13 is optionally also configured so as to be adjustable in terms of its orientation.

Owing to the described orientation of the holding apparatus 13, the means 14 for separating is movable, or pivotable, laterally, namely in the X-/Z-plane, for movement from the standby position into the separating position and back. Optionally, and depending on the orientation of the holding apparatus 13, the means 14 for separating can also have an orientation other than that shown, for example such that the means 14 is movable towards and away from the holding apparatus 13 from above and/or below in the X-/Y-plane.

The apparatus 10 can have a single combination tool 15 or 16. However, the means 14 for separating preferably comprises two combination tools 15, 16 which are arranged on mutually opposite sides of the transport path, wherein the two combination tools 15, 16 are arranged offset relative to one another diametrically (as in FIGS. 1 to 3) or in the direction of transport T. With the preferred embodiment according to FIG. 1, synchronous processing of a breast cap from two sides is ensured. The two combination tools 15, 16 can be jointly actuatable. However, the combination tools 15, 16 are preferably controllable separately.

Each combination tool 15, 16 is configured so as to be pivotable about a vertically directed axis which is oriented perpendicularly to the direction of transport T. The pivot axes $S_1$ and $S_2$ run parallel to one another. The combination tools 15, 16 each have an adjusting mechanism 17, 18, which in each case comprises a pneumatic cylinder 19, 20 or other adjusting members for moving the combination tools 15, 16 from the standby position into the separating position and back. The adjusting mechanism 17, 18 will be described further hereinbelow.

Each combination tool 15, 16 comprises a blade holder 21, 21.1 and a blade 22, 22.1, wherein the blade holder 21, 21.1 on the side facing the transport path is configured and adapted so as to be blunt for displacing the breast fillet, while the blade 22, 22.1 on the side remote from the transport path is configured and adapted so as to be sharp-edged for separating the tendon. The combination tool 15, 16 accordingly has two functional sides, of which one, namely the displacing side, faces the holding apparatus 13 and thus the breast cap or the like, and the other, namely the cutting side, is remote from the holding apparatus 13 and is shielded with respect to the breast cap by the blade holder 21, 21.1.

Figure 1:
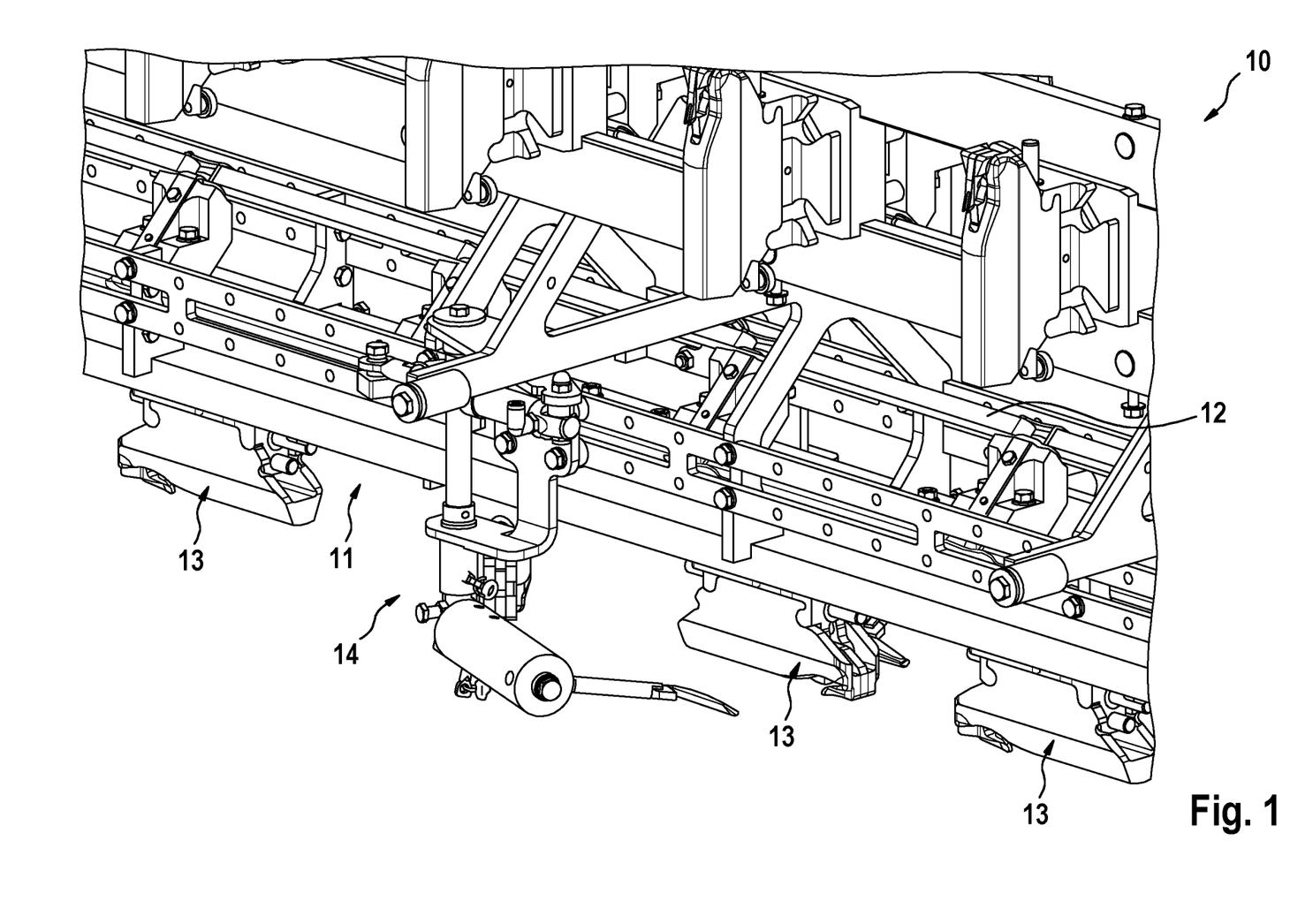
FIG. 1 is a perspective view of a detail of an apparatus for separating at least one tendon connecting a breast fillet of a gutted poultry body from which wings have been removed, or a part thereof, to a carcass of the poultry body or part thereof, having two combination tools, or tool units, arranged on both sides of a transport path, in the standby position.

The blade holder 21, 21.1 has a blunt threading edge 23, 24 which, in the standby position of the combination tool 15, 16, when seen in the direction of transport T, is oriented so as to taper in that direction and, in the separating position of the combination tool 15, 16, is oriented approximately parallel to the direction of transport T. In FIG. 1, the separating position is shown, in which the two threading edges 23, 24 run approximately parallel to one another. The blunt threading edges 23, 24 have at their free end 25, 26, which faces in the opposite direction to the direction of transport T, a rounded guiding lug 27, 28, which covers the blade 22, 22.1 in the direction of transport T. In other words, the breast cap or the like, when the combination tools 15, 16 are pivoted into the separating position, as it is transported further in the direction of transport T, first comes into contact with the guiding lugs 27, 28, which then, owing to the transport movement of the breast cap, advance into the region of the wing joint, so that the tendon is correspondingly threaded via the guiding lugs 27, 28 onto the blade holder 21, 21.1 and guided in the direction towards the blade 22, 22.1.

The blade 22, 22.1 has a sharp cutting edge 29, 30 which in the separating position, starting from the transport path, when seen in the direction of transport T, is oriented so as to run outwards so that, as the breast caps continue to be transported in the direction of transport T, the threaded tendons are guided outwards and are thereby tightened, as it were, whereby the pressure of the tendon on the sharp cutting edge 29, 30 increases, which ultimately leads to reliable separation/cutting of the tendon.

The combination tool 15, 16 can be in multi-part form. The individual parts blade holder 21, 21.1 and blade 22, 22.1, are then connected to one another fixedly but releasably and optionally adjustably relative to one another. The blade holder 21, 21.1, which also comprises the guiding lug 27, 28, can thereby be produced from plastics material, for example, while the blade 22, 22.1 consists of stainless steel. In the described example, the blade holder 21, 21.1 and the blade 22, 22.1 are formed integrally with one another and produced from stainless steel. Other forms of the combination tool 15, 16 and also other materials, such as, for example, ceramics, and material combinations may likewise be used.

The blade holder 21, 21.1 and/or the blade 22, 22.1 is/are advantageously releasably arranged on an adjusting arm 31, 32, wherein the adjusting arm 31, 32 is configured and adapted so as to be adjustable in respect of its position transversely to the direction of transport T in order to change the distance of the combination tool 15, 16 from the holding apparatus 13 and thus to change the depth of penetration of each combination tool 15, 16 into the poultry body to be processed or the part thereof. The adjusting arm 31, 32 can also be formed integrally with the blade holder 21, 21.1 and/or the blade 22, 22.1. In the embodiment shown, the adjusting arm 31, 32 is a simple round profile which has a bevel 33, 34 in order to fasten the adjusting arm 31, 32 to a carrier 35, 36 so that it is secured against twisting. The adjusting arm 31, 32 can, however, also have other forms and configurations.

The adjusting arm 31, 32 forms together with the combination tool 15, 16 an L-shaped tool unit 37, 38, wherein the adjusting arm 31, 32 forms the long leg of the L, while the combination tool 15, 16 forms the short leg of the L. The blade 22, 22.1 is formed on the inner side of the short leg, which faces the adjusting arm 31, 32. The blade holder 21, 21.1 is formed on the outer side of the short leg, which is remote from the adjusting arm 31, 32.

The adjusting arm 31, 32, as part of the adjusting mechanism 17, 18, is arranged on the carrier 35, 36. The carrier 35, 36 is, for example, a cylindrical body to which the adjusting arm 31, 32 is fixedly (so that it is secured against twisting) but releasably fastened. The adjusting mechanism 17, 18 further comprises a shaft 39, 40 or the like, to which the carrier 35, 36 is fastened, and the pneumatic cylinders 19, 20, by means of which the shaft 39, 40 is movable, namely rotatable, via a lever 41, 42 or the like for performing the pivot movement of the combination tool 15, 16. The pneumatic cylinders 19, 20 are for this purpose fastened at one end to the lever 41, 42. At the opposite end, the pneumatic cylinders 19, 20 are fastened to a flange 43, 44 and are held thereby. The flanges 43, 44 are in turn fixedly arranged on a housing/frame or the like, not shown explicitly, of the apparatus 10, preferably releasably, for example by means of screws 45. Other configurations of the adjusting mechanism 17, 18 which permit a movement of the combination tool 15, 16, which movement can also be linear, from the standby position into the separating position and back are likewise possible.

The blade holder 21, 21.1 and/or the blade 22, 22.1 is/are configured and adapted so as to be adjustable in terms of its/their position or orientation relative to the holding apparatus 13 in order to change the angle of the cutting edge 29, 30 and/or of the threading edge 23, 24 relative to the direction of transport T. In the case of an integral form of the combination tool 15, 16, the change takes place synchronously. In the case of a multi-part form, the blade 22, 22.1 can also be adjusted relative to the blade holder 21, 21.1. In addition to the adjustment of the combination tool 15, 16 in the Z-direction (see FIGS. 2 and 3) and an adjustment of the angle of the threading edge 23, 24 and cutting edge 29, 30, that is to say of the angle between the longitudinal axis Ls of the cutting edge 29, 30, on the one hand, and the longitudinal axis $L_F$ of the threading edge 23, 24, on the other hand, relative to the direction of transport T, each combination tool 15, 16 is alternatively or cumulatively also configured and adapted so as to be adjustable in the vertical direction relative to the direction of transport T, that is to say in the Y-direction (see FIGS. 2 and 3). This adjustability can take place, for example, by a vertical movement of the adjusting mechanism 17, 18 as a whole.

Each combination tool 15, 16 is preferably connected to a—separate or common—control and/or regulating device, not shown explicitly, such that the time at which the combination tool 15, 16 penetrates the poultry body to be processed or the part thereof, that is to say in particular the movement from the standby position into the separating position and back, can be controlled and/or regulated individually. More precisely, the pneumatic cylinder 19, 20—or a corresponding actuating means—is connected to the control and/or regulating device. The drives for the transport unit 12 can also be connected to the or each control and/or regulating device. Other drives, adjusting motors or the like, which are not shown, can also be connected to the or each control and/or regulating device. The control and/or regulating device can further be connected to a computer which comprises storage media and/or databases.

The apparatus 10 can be used as an individual apparatus. However, further processing tools, for example in the form of scraping tools, knives, circular knives or the like, are preferably arranged along the transport path of the transport unit 12 to form a breast-cap-filleting apparatus.

The combination tools 15, 16, and preferably the tool units 37, 38 formed of the combination tool 15, 16 and the adjusting arm 31, 32, are in the form of an interchangeable or replacement part. The tool units 37, 38 are configured and adapted to separate a tendon connecting a breast fillet of a gutted poultry body from which wings have been removed, or a part thereof, to a carcass of the poultry body or part thereof, in particular to carry out the method as disclosed herein. The tool units 37, 38 particularly preferably comprise an adjusting arm 31, 32 and a separating unit formed of a blade holder 21, 21.1 and a blade 22, 22.1, which separating unit is fastened to the adjusting arm 31, 32 to form an L-shaped unit, wherein the adjusting arm 31, 32 forms the long leg of the L and the combination tool 15, 16 forms the short leg of the L, and wherein the blade holder 21, 21.1 covers the blade 22, 22.1 on a longitudinal side of the blade 22, 22.1 and on an end face of the blade 22, 22.1 to form a blunt displacing portion, while the blade 22, 22.1 has a sharp-edged separating portion on the longitudinal side opposite the blunt longitudinal side, wherein the inner side of the short leg facing the adjusting arm 31, 32 forms the sharp-edged separating portion and the outer side of the short leg facing away from the adjusting arm 31, 32 forms the displacing portion.

The method according to the invention will be described in greater detail hereinbelow with reference to the drawing.

The method is configured and adapted to separate a tendon connecting a breast fillet of a gutted poultry body from which wings have been removed, or a part thereof, to a carcass of the poultry body or part thereof. A poultry body or a part thereof, for example a breast cap, is first automatically or manually pushed onto a holding apparatus 13 fastened to a transport unit 12, that is to say saddled. In the example of a breast cap, saddling takes place, for example, with the coracoids first. The saddled poultry body or the part thereof is then transported by means of the transport unit 12 along a transport path in the direction of transport T, with the anus side leading, in the direction towards a means 14 for separating. In cases where the poultry body or the part thereof is transported with the coracoids to the front or at the side, the holding apparatus 13 is rotated before it reaches the means 14 for separating, so that the poultry body or the part thereof reaches the means 14 for separating with the anus side leading. As the poultry body or the part thereof is transported through the means 14 for separating, the tendon is separated by the means 14 for separating in that the means 14 for separating is moved from a standby position into a separating position when the poultry body or the part thereof is transported past the means 14 for separating. After the tendon has been separated, the means 14 for separating is moved back into the standby position.

This method is distinguished according to the invention in that at least the means 14 for separating, as it moves from the standby position into the separating position, penetrates the breast fillet with a portion that displaces the breast fillet and thereby initially only picks up the tendon, and, as the poultry body or the part thereof is transported further, the tendon is then guided onto a portion that separates the tendon, whereby the tendon is separated completely. Accordingly, "collection" of the tendon is carried out first, without—in the example of the breast cap—cutting or otherwise damaging the outer fillet and without cutting through to the inner fillet. Ultimately, the breast fillet is only pushed to the side by the portion that displaces the breast fillet and a path is opened up inside the breast cap, so that the means 14 for separating is able to pick up the tendon in the region of the wing joint. Only then does the actual cutting step take place.

As described, the method is configured and adapted to separate at least one tendon connecting a breast fillet of a gutted poultry body from which wings have been removed, or a part thereof, to a carcass of the poultry body or part thereof. However, two tendons are preferably separated by the method, namely, for two breast fillets, tendons associated with each breast fillet are separated synchronously or with a temporal offset. However, the method also comprises the separation of more than one tendon for each breast fillet, for example in the case where each breast fillet is connected to the carcass by more than one tendon or tendon portions.

The means 14 for separating preferably comprises at least one combination tool 15, 16 which comprises a blade holder 21, 21.1 and a blade 22, 22.1, wherein the blade holder 21, 21.1, on pivoting from the standby position into the separating position, lightly penetrates the poultry body or the part thereof with a blunt threading edge 23, 24, without cutting the poultry body or the part thereof, and thereby threads the tendon, and the tendon, as a result of the poultry body or the part thereof being transported further, is guided onto a sharp-edged cutting edge 29, 30 of the blade 22, 22.1 and is cut. During the penetration of the combination tool 15, 16 and the threading of the tendon, the blade 22, 22.1 is covered by the blade holder 21, 21.1, so that contact of the poultry body or the part thereof with the blade 22, 22.1 is prevented until the tendon has been found and threaded.

The method is particularly preferably carried out with an apparatus as has been described hereinbefore. The tool unit 37, 38 is thereby particularly preferably used.

The invention claimed is:

1. An apparatus, configured and adapted to separate at least one tendon connecting a breast fillet of a gutted poultry body from which wings have been removed, or a part thereof, to a carcass of the poultry body or part thereof, comprising:
    a transport apparatus having a transport unit which is driven in a revolving manner, and at least one holding apparatus fastened thereto which is configured and adapted to hold the poultry body or the part thereof during processing, and a means for separating the tendon, wherein the means for separating is configured and adapted so as to be movable from a standby position into a separating position and back, and the transport unit, with the or each holding apparatus, with the formation of a transport path, is configured and adapted to transport the poultry body or the part thereof in a direction of transport T, with an anus side leading, in a direction towards the means for separating;
    wherein the means for separating the tendon comprises at least one combination tool which is configured and adapted such that said tool has a portion that displaces the breast fillet and a portion that separates the tendon.

2. The apparatus according to claim 1, wherein the at least one combination tool comprises two combination tools which are arranged on mutually opposite sides of the transport path, wherein the two combination tools are arranged offset relative to one another diametrically or in the direction of transport T.

3. The apparatus according to claim 2, wherein each combination tool comprises a blade holder and a blade, wherein the blade holder on a side facing the transport path is configured and adapted so as to be blunt for displacing the breast fillet, while the blade on a side remote from the transport path is configured and adapted so as to be sharp-edged for separating the tendon.

4. The apparatus according to claim 3, wherein the blade holder has a blunt threading edge which in the standby position of the combination tool, when seen in the direction of transport T, is oriented so as to taper in that direction and in the separating position of the combination tool is oriented approximately parallel to the direction of transport T.

5. The apparatus according to claim 4, wherein the blunt threading edge has at a free end, which faces in an opposite direction to the direction of transport T, a rounded guiding lug which covers the blade in the direction of transport T.

6. The apparatus according to claim 3, wherein the blade holder and the blade are formed integrally with one another and produced from stainless steel.

7. The apparatus according to claim 3, wherein the blade holder and/or the blade is/are releasably arranged on an adjusting arm, wherein the adjusting arm is configured and adapted so as to be adjustable in respect of its position transversely to the direction of transport T in order to change a distance of the combination tool from the holding apparatus and thus to change a depth of penetration of each combination tool into the poultry body to be processed or the part thereof.

8. The apparatus according to claim 3, wherein the blade holder and/or the blade is/are configured and adapted so as to be adjustable in terms of its/their position, or orientation, relative to the holding apparatus in order to change an angle of a cutting edge and/or of a threading edge relative to the direction of transport T.

9. The apparatus according to claim 1, wherein each combination tool is configured so as to be pivotable about a vertically directed axis which is oriented perpendicularly to the direction of transport T.

10. The apparatus according to claim 1, wherein each combination tool is configured and adapted so as to be adjustable in a vertical direction relative to the direction of transport T.

11. The apparatus according to claim 1, wherein each combination tool is connected to a control and/or regulating device, such that a time of penetration of the combination tool into the poultry body to be processed or the part thereof is controlled and/or regulated individually.

12. The apparatus according to claim 1, wherein each combination tool is connected to a control and/or regulating device, such that a time of movement from the standby position into the separating position and back is controlled and/or regulated individually.

13. A method to separate at least one tendon connecting a breast fillet of a gutted poultry body from which wings have been removed, or a part thereof, to a carcass of the poultry body or part thereof, comprising the steps:
    saddling the poultry body or the part thereof onto a holding apparatus fastened to a transport unit;
    transporting the poultry body or the part thereof by means of the transport unit along a transport path in a direction of transport, with an anus side leading, in a direction towards a means for separating;
    separating the tendon with the means for separating by moving the means for separating from a standby position into a separating position when the poultry body or the part thereof is transported past the means for separating;
    wherein the means for separating is moved back into the standby position after the tendon has been separated; and
    wherein, as the means for separating moves from the standby position into the separating position, the means for separating penetrates a breast fillet with a portion of the means for separating that displaces the breast fillet and thereby initially only picks up the tendon and, as the poultry body or the part thereof is transported further, the tendon is then guided onto a portion of the means for separating that separates the tendon, whereby the tendon is separated completely.

14. The method according to claim 13, wherein the means for separating comprises at least one combination tool which comprises a blade holder and a blade, wherein the blade holder, on pivoting from the standby position into the separating position, lightly penetrates the poultry body or the part thereof with a blunt threading edge, without cutting the poultry body or the part thereof, and thereby threads the tendon, and the tendon, as a result of the poultry body or the part thereof being transported further, is guided onto a sharp-edged cutting edge of the blade and is cut.

15. The method according to claim 13, wherein the method is carried out with an apparatus comprising:
- a transport apparatus having a transport unit which is driven in a revolving manner, and at least one holding apparatus fastened thereto which is configured and adapted to hold the poultry body or the part thereof during processing, and a means for separating the tendon, wherein the means for separating is configured and adapted so as to be movable from a standby position into a separating position and back, and the transport unit, with the or each holding apparatus, with the formation of a transport path, is configured and adapted to transport the poultry body or the part thereof in a direction of transport T, with an anus side leading, in a direction towards the means for separating;
- wherein the means for separating the tendon comprises at least one combination tool which is configured and adapted such that said tool has a portion that displaces the breast fillet and a portion that separates the tendon.

16. A tool unit, configured and adapted to separate a tendon connecting a breast fillet of a gutted poultry body from which wings have been removed, or a part thereof, to a carcass of the poultry body or part thereof, comprising:
- an adjusting arm; and
- a combination tool which is formed of a blade holder and a blade and is fastened to the adjusting arm to form an L-shaped unit;
- wherein the adjusting arm forms a long leg of the L and the combination tool forms a short leg of the L;
- wherein the blade holder covers the blade on a longitudinal side of the blade and on an end face of the blade to form a blunt displacing portion, while the blade has a sharp-edged separating portion on a longitudinal side opposite the blunt longitudinal side;
- wherein an inner side of the short leg facing the adjusting arm forms the sharp-edged separating portion and an outer side of the short leg facing away from the adjusting arm forms the displacing portion.

17. The tool according to claim 16, wherein the tool is for carrying out a method comprising the steps:
- saddling the poultry body or the part thereof onto a holding apparatus fastened to a transport unit;
- transporting the poultry body or the part thereof by means of the transport unit along a transport path in a direction of transport, with an anus side leading, in a direction towards the combination tool;
- separating the tendon with the combination tool by moving the blade holder from a standby position into a separating position when the poultry body or the part thereof is transported past the combination tool;
- wherein the blade holder is moved back into the standby position after the tendon has been separated; and
- wherein as the blade holder moves from the standby position into the separating position, the blade holder penetrates the breast fillet with the blunt displacing portion that displaces the breast fillet and thereby initially only picks up the tendon and, as the poultry body or the part thereof is transported further, the tendon is then guided onto the sharp-edged separating portion that separates the tendon, whereby the tendon is separated completely.

* * * * *